United States Patent
Tang

(10) Patent No.: US 11,212,785 B2
(45) Date of Patent: Dec. 28, 2021

(54) METHOD FOR TRANSMITTING SCHEDULING REQUEST AND TERMINAL DEVICE

(71) Applicant: SHENZHEN HEYTAP TECHNOLOGY CORP., LTD., Guangdong (CN)

(72) Inventor: Hai Tang, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/851,877

(22) Filed: Apr. 17, 2020

(65) Prior Publication Data

US 2020/0260433 A1    Aug. 13, 2020

Related U.S. Application Data

(63) Continuation of application No. PCT/CN2018/107353, filed on Sep. 25, 2018.

(51) Int. Cl.
*H04W 72/12* (2009.01)
*H04W 72/04* (2009.01)
*H04W 72/10* (2009.01)

(52) U.S. Cl.
CPC ....... *H04W 72/0413* (2013.01); *H04W 72/10* (2013.01); *H04W 72/12* (2013.01)

(58) Field of Classification Search
CPC .. H04W 72/12; H04W 72/10; H04W 72/0413

USPC .......................................................... 370/329
See application file for complete search history.

(56) References Cited

FOREIGN PATENT DOCUMENTS

| CN | 101980575 A | 2/2011 |
|---|---|---|
| CN | 102013954 A | 4/2011 |
| CN | 103299699 A | 9/2013 |
| CN | 104661316 A | 5/2015 |
| CN | 104685916 A | 6/2015 |
| CN | 105684488 A | 6/2016 |
| CN | 105850207 A | 8/2016 |
| CN | 107113150 A | 8/2017 |

OTHER PUBLICATIONS

The EESR of corresponding European application No. 18867791.8. dated Aug. 7, 2020.

(Continued)

*Primary Examiner* — Angel T Brockman
(74) *Attorney, Agent, or Firm* — Ladas & Parry LLP

(57) ABSTRACT

Embodiments of the present disclosure provide a method and a terminal device for transmitting a scheduling request. The method includes: determining that there are a plurality of PUCCH resources at a target time point, where the plurality of PUCCH resources correspond to different SR configurations, and the different SR configurations correspond to different logical channels; determining one or more target PUCCH resources among the plurality of PUCCH resources according to priorities of the different logical channels; and transmitting one or more SRs to a network device at the target time point by using the one or more target PUCCH resources.

10 Claims, 2 Drawing Sheets

(56) References Cited

OTHER PUBLICATIONS

Intel Corporation: "Handling of multiple SR configuration", 3GPP Draft; R2-1710605 SR, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Oct. 8, 2017(Oct. 8, 2017), XP051342641.

Interdigital Inc:"Multiple SR Configurations in NR", 3GPP Draft: R2-1710658(R15 NR WI AI10315 SR Configurations), 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Oct. 8, 2017(Oct. 8, 2017), XP051342688.

Mediatek Inc:"SR design supporting multiple configurations", 3GPP Draft; R2-1711303 SR Design Supporting Multiple Configurations, 3rd Generation Partnership Project (3GPP), Mobile Competence Centre; 650, Route Des Lucioles; F-06921 Sophia-Antipolis Cedex; FR, vol. RAN WG2, No. Prague, Czech Republic; Oct. 9, 2017-Oct. 13, 2017 Oct. 8, 2017(Oct. 8, 2017) XP051343297.

Qualcomm:"SR procedures with multiple configurations", 3GPP Draft; R2-1711696 SR Procedures With Multiple SR Configuration, 3rd Generation Partnership Project (3GPP), Mobile Competence Centre; 650, Route Des Lucioles; F-06921 Sophia-Antipolis Cedex; F, vol. RAN WG2, No. Prague, Czech Republic; Oct. 9, 2017-Oct. 13, 2017 Oct. 8, 2017(Oct. 8, 2017), XP051343654.

International Search Report (ISR) dated Dec. 14, 2018 for Application No. PCT/CN2018/107353.

The first Office Action of corresponding European application No. 18867791,8, dated May 26, 2021.

Huawei et al.:"Support of multiple SR configurations". 3GPP Draft: R2-1706900 Support of Multiple SR Configurations, 3RD Generation Partnership Project (3GPP), Mobile Competence Centre 650, Route Des Lucioles; F-06921 Sophia-Antipolis Cedex; France, vol. RAN WG2, No. Qingdao, China; Jun. 27, 2017-Jun. 29, 2017 Jun. 26, 2017(Jun. 26, 2017), XP051301397.

METHOD FOR TRANSMITTING SCHEDULING REQUEST AND TERMINAL DEVICE

CROSS-REFERENCE TO RELATED APPLICATION

This application is a continuation of the International Application No. PCT/CN2018/107353, filed on Sep. 25, 2018, which claims priority to the International Application No. PCT/CN2017/107167, filed on Oct. 20, 2017. The disclosures of the aforementioned applications are hereby incorporated by reference in their entireties.

TECHNICAL FIELD

The present disclosure relates to the field of communications, and in particular, to a method for transmitting scheduling request and a terminal device.

BACKGROUND

In a new radio (NR) system, a scheduling request (SR) configuration may correspond to a collection of sets of physical uplink control channel (PUCCH) resources, where different sets of PUCCH resources correspond to different objects including bandwidth parts (BWPs) and cells. For example, if a cell (or a carrier) is configured with n BWPs, then the number of sets of PUCCH resources included in the SR configuration may be a product of n and the number of cells supporting PUCCH. Meanwhile, for each cell, there is only one set of PUCCH resources usable per logical channel per cell at any time, which corresponds to the case of only one BWP being active per cell at a time for a physical layer.

In addition, a mapping relationship between a logical channel and an SR configuration refers to a case that a logical channel may be mapped to none or at most one SR configuration. Therefore, there may be the situation that two or more logical channels are mapped to different SR configurations, and the different PUCCH resources corresponding to the different SR configurations collide at a same time point.

SUMMARY

The present disclosure provides a method for transmitting SR and a terminal device.

In a first aspect, a method for transmitting SR is provided, including: determining that there are a plurality of PUCCH resources at a target time point, where the plurality of PUCCH resources correspond to different SR configurations, and the different SR configurations correspond to different logical channels; determining one or more target PUCCH resources among the plurality of PUCCH resources according to priorities of the different logical channels; and transmitting one or more SRs to a network device at the target time point by using the one or more target PUCCH resources.

With reference to the first aspect, in an implementation manner of the first aspect, the determining one or more target PUCCH resources among the plurality of PUCCH resources according to priorities of the different logical channels includes: determining one or more logical channels with the highest priority among the different logical channels as target logical channel; determining one or more SR configurations corresponding to the one or more target logical channels as target SR configuration, and determining one or more PUCCH resources corresponding to the one or more target SR configurations among the plurality of PUCCH resources as target PUCCH resource.

With reference to the first aspect and the foregoing implementation manner of the first aspect, in another implementation manner of the first aspect, the one or more logical channels with the highest priority among the different logical channels includes at least two logical channels, the determining one or more logical channels with the highest priority among the different logical channels as target logical channel includes: determining the one or more target logical channels randomly among the at least two logical channels.

The target logical channel may be selected among the at least two logical channels according to a preset rule.

With reference to the first aspect and the foregoing implementation manners of the first aspect, in another implementation manner of the first aspect, the method further includes: receiving one or more radio resource control (RRC) messages transmitted by the network device; and determining the priorities of the different logical channels according to the one or more RRC messages.

With reference to the first aspect and the foregoing implementation manners of the first aspect, in another implementation manner of the first aspect, the one or more target PUCCH resources includes at least two PUCCH resources.

With reference to the first aspect and the foregoing implementation manners of the first aspect, in another implementation manner of the first aspect, the transmitting the one or more SRs to a network device at the target time point by using the one or more target PUCCH resources includes: transmitting, via the at least two PUCCH resources, same SR to the network device at the target time point.

With reference to the first aspect and the foregoing implementation manners of the first aspect, in another implementation manner of the first aspect, the transmitting the one or more SRs to a network device at the target time point by using the one or more target PUCCH resources includes: determining one PUCCH resource among the at least two PUCCH resources; and transmitting, via the one PUCCH resource, a SR to the network device at the target time point.

With reference to the first aspect and the foregoing implementation manners of the first aspect, in another implementation manner of the first aspect, the determining one PUCCH resource among the at least two PUCCH resources includes: determining, by way of listen before talk (LBT), the one PUCCH resource among the at least two PUCCH resources.

With reference to the first aspect and the foregoing implementation manners of the first aspect, in another implementation manner of the first aspect, the plurality of PUCCH resources correspond to different SRs, and the transmitting the one or more SRs to a network device at the target time point by using the one or more target PUCCH resources includes: transmitting, via the one or more target PUCCH resources, the one or more SRs corresponding to the one or more target PUCCH resources to the network device at the target time point.

With reference to the first aspect and the foregoing implementation manners of the first aspect, in another implementation manner of the first aspect, the plurality of PUCCH resources correspond to different cells and/or different BWPs.

With reference to the first aspect and the foregoing implementation manners of the first aspect, in another implementation manner of the first aspect, each of the different logical channels corresponds to at most one SR configuration.

With reference to the first aspect and the foregoing implementation manners of the first aspect, in another implementation manner of the first aspect, each of the SR configurations in the different SR configurations includes at least one sets of PUCCH resources, where each of the at least one sets of PUCCH resources is a PUCCH resource with a configuration period, and each set of PUCCH resources is located on a preset BWP.

In a second aspect, a terminal device is provided for performing the method according to the foregoing first aspect or any possible implementation manners of the first aspect. Specifically, the terminal device includes a unit for performing the method according to the foregoing first aspect or any possible implementation manners of the first aspect.

In a third aspect, a terminal device is provided, including: a memory and a processor, where the memory is configured to store instructions, the processor is configured to execute the instructions stored in the memory, and when the processor executes the instructions stored in the memory, the execution causes the processor to perform the method according to the first aspect or any possible implementation manners of the first aspect.

In a fourth aspect, a computer-readable medium is provided for storing a computer program, the computer program includes instructions for performing the method according to the first aspect or any possible implementation manners of the first aspect.

According to a fifth aspect, a computer program product including instructions is provided. When a computer runs the instructions in the computer program product, the computer performing the method for transmitting an SR according to the foregoing first aspect or any possible implementation manners of the first aspect. Specifically, the computer program product may run on the terminal device of the third aspect.

DESCRIPTION OF EMBODIMENTS

A technical solution of embodiments of the present disclosure will be described below with reference to the drawings.

The technical solutions of embodiments of the present disclosure can be applied to various communication systems, such as: a global system of mobile communication (GSMC) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), an universal mobile telecommunication system (UMTS), a worldwide interoperability for microwave access (WiMAX) communication system, a future 5th generation (5G) system or NR.

A terminal device in embodiments of the present disclosure may refer to a user equipment, an access terminal, a user unit, a user station, a mobile station, a mobile platform, a remote station, a remote terminal, a mobile device, a user terminal, a terminal, a wireless communication device, a user agent, or a user device. The terminal device may also be a cellular phone, a cordless phone, a session initiation protocol (SIP) phone, a wireless local loop (WLL) station, a personal digital assistant (PDA), a handheld device with wireless communication function, a computing device, or other processing devices connected to a wireless modem, an in-vehicle device, a wearable device, a terminal device in a future 5G network, or a terminal device in a future evolutional public land mobile network (PLMN), which is not limited in embodiments of the present disclosure.

The network device in embodiments of the present disclosure may refer to a device communicating with a terminal device. The network device may be a base transceiver station (BTS) in a GSMC system or CDMA, or a NodeB (NB) in a WCDMA system, and may also be an evolutional NodeB (eNB or eNodeB) in a LTE system, or a wireless controller in a cloud radio access network (CRAN) scenario, or the network device may be a relay station, an access point, an in-vehicle device, a wearable device, a network device in a future 5G network, or a network device in a future evolved PLMN network, etc., which is not limited in embodiments of the present disclosure.

Figures 1, 2:
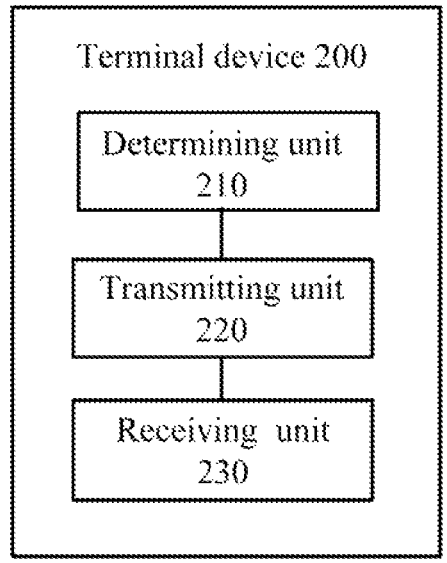
FIG. 1 is a schematic flowchart of a method for transmitting SR according to an embodiment of the present disclosure.
FIG. 2 is a schematic block diagram of a terminal device according to an embodiment of the present disclosure.

FIG. 1 shows a schematic flowchart of a method 100 for transmitting SR according to an embodiment of the present disclosure. The method 100 may be executed by a terminal device. As shown in FIG. 1, the method 100 includes:

S110: determining that there are a plurality of PUCCH resources at a target time point, where the plurality of PUCCH resources correspond to different SR configurations, and the different SR configurations correspond to different logical channels.

The SR in the embodiment of the present disclosure may be used to request an uplink resource from a network device. For example, when there is uplink data to be transmitted at the terminal device side, the terminal device may request the network device to allocate an uplink resource through the SR, so that the network device allocates an uplink resource to the terminal device according to the SR.

The SR in the embodiment of the present disclosure has a corresponding SR configuration. For any SR configuration, an SR counter and a timer may be maintained for the SR configuration. The role of the SR Counter is to record the number of transmissions of the SR corresponding to the SR configuration. The role of the SR Timer is to prevent excessive SR retransmissions, for example, when an SR corresponding to the SR configuration has been transmitted within operation time of the Timer, and a time point for SR transmission of a next cycle arrives, a transmission will be prohibited by the Timer.

In the embodiment of the present disclosure, at any time, there may be one or more SRs in a pending state in a media access control (MAC) entity of the terminal device. The pending state refers to a case where a transmission of an SR is triggered according to a trigger condition of a regular buffer status report (BSR), but a time point for SR transmission has not arrived, then the triggered SR is put into the pending state by the MAC entity.

It should be understood that, at a target time point, a plurality of PUCCH resources are available in a MAC entity of a terminal device, where the plurality of PUCCH resources correspond to a plurality of SRs, that is, each PUCCH resource of the plurality of PUCCH resources corresponds to a SR. There are at least two PUCCH resources among the plurality of PUCCH resources correspond to different SRs, or there may be two or more PUCCH resources correspond to the same SR. The target time point may be any time. The plurality of SRs have different SR configurations, that is, the plurality of PUCCH resources correspond to different SR configurations, and the different SR configurations have mapping relationships with different logical channels. The plurality of SRs have different SR configurations, including: each of the SRs corresponds to a SR configuration, there may be two or more SRs among the plurality of SRs correspond to the same SR configuration and, meanwhile, there are also at least two SRs correspond to different SR configurations, accordingly, there may be multiple PUCCH resources among the plurality of PUCCH resources correspond to the same SR configuration, and there are also at least two PUCCH resources correspond to different SR configurations.

The plurality of PUCCH resources in the embodiment of the present disclosure may be in different bandwidth parts, or may be in different cells, or may be in different bandwidth parts and different cells, which is not limited in the embodiment of the present disclosure.

It should be understood that, a plurality of PUCCH resources correspond to different SR configurations, where each of the SR configurations includes one or more set(s) of PUCCH resources and where each set of PUCCH resources refers to a PUCCH resource with a certain configuration period including the time domain period and the frequency domain period. In addition, any set of PUCCH resources may be located on a certain configured BWP.

There's a mapping relationship between the SR configurations and the logical channels in the embodiment of the present disclosure. Each logical channel is mapped to at most one SR configuration, and each SR configuration may be mapped to one or more logical channels.

The method 100 further includes:

S120: determining one or more target PUCCH resources among the plurality of PUCCH resources according to priorities of the different logical channels.

In the present disclosure, for different logical channels that are mapped to different SR configurations corresponding to a plurality of PUCCH resources, a priority of each logical channel in the different logical channels may be determined, and a target logical channel from the plurality of different logical channels is determined according to the priority of each logical channel, an SR configuration corresponding to the target logical channel is determined as target SR configuration, and a PUCCH resource corresponding to the target SR configuration among the plurality of PUCCH resources is determined as a target PUCCH resource.

In an implementation, the terminal device may determine one or more logical channels with the highest priority among the different logical channels as target logical channel. Specifically, when there is one logical channel with the highest priority among the different logical channels, the logical channel with the highest priority is determined as the target logical channel; when there are at least two logical channels with the same highest priority among the different logical channels, the at least two logical channels may both be determined as the target logical channels; alternatively, one of the at least two logical channels may be selected as the target logical channel randomly or according to another rule; alternatively, determine at least one SR configuration corresponding to the at least two logical channels and determine at least one PUCCH resource corresponding to the at least one SR configuration, if the at least one PUCCH resource is a plurality of different PUCCH resources, the target PUCCH resource is selected by randomly selecting among the different PUCCH resources or according to a preset rule, which is not limited in the embodiment of the present disclosure.

In an implementation, the terminal device may receive one or more RRC messages transmitted by the network device, where the RRC message is used to indicate a priority of a logical channel of the terminal device, and then the terminal device may determine priorities of different logical channels that are mapped to different SR configurations corresponding to different PUCCH resources according to the one or more RRC messages.

The method 100 further includes:

S130: transmitting one or more SRs to a network device at the target time point by using the one or more target PUCCH resources.

Specifically, the terminal device determines an SR corresponding to the target PUCCH resource, and transmits the corresponding SR to the network device at the target time point by using the target PUCCH resource, where the SR has the target SR configuration corresponding to the target PUCCH resource, and the target SR configuration corresponds to the target logical channel.

In an implementation, the target PUCCH resource determined by the terminal device may only include one PUCCH resource, or may include at least two PUCCH resources. If the target PUCCH resource is one PUCCH resource, the terminal device transmits the corresponding SR to the network device by using the one target PUCCH; if the target PUCCH resource includes at least two PUCCH resources, the terminal device may use the at least two PUCCH resources to transmit the same SR, or the terminal device determine one PUCCH resource among the at least two PUCCH resources to transmit the SR.

Specifically, for the case that the target PUCCH resource includes at least two PUCCH resources, the terminal device may use the at least two PUCCH resources to transmit the same SR; alternatively, the terminal device may select one or more PUCCH resources among the at least two PUCCH resources randomly or according to a certain rule to transmit the SR, which is not limited in the embodiment of the present disclosure.

In an implementation, for the case that the PUCCH resource includes at least two PUCCH resources, the terminal device may select, by way of listen before talk (LBT), one or more resources among the at least two PUCCH resources to transmit the SR. Specifically, the terminal device performs LBT on PUCCH resources on an unauthorized frequency band, selects an un-occupied PUCCH resource among the at least two PUCCH resources according to the result of LBT to transmit the SR; or the terminal device selects multiple un-occupied PUCCH resources among the at least two PUCCH resources according to the result of LBT to transmit the same SR, which is not limited in the embodiment of the present disclosure.

Therefore, in the method for transmitting SR according to the embodiment of the present disclosure, when there are a plurality of PUCCH resources available at any time, where the plurality of PUCCH resources correspond to different SR configurations and the different SR configurations correspond to different logical channels, a terminal device may select an SR configuration corresponding to a logical channel with a highest priority according to priorities of the different logical channels, and transmit an SR to a network device by using a PUCCH resource corresponding to the SR configuration among the plurality of PUCCH resources, so as to avoid collisions among the plurality of PUCCH resources, thereby improving transmission efficiency.

It should be understood that, in the various embodiments of the present disclosure, the order of the sequence numbers in the above processes is not intended to indicate an execution order. The execution order of each process should be determined by its function and internal logic, and shall not be construed as a limitation to the implementation process of the embodiment of the present disclosure.

In addition, the term "and/or" herein merely refers to an association relationship describing associated objects, indicating that there may be three kinds of relationships, for example. A and/or B can may represents the following three situations: A exists alone, A and B exist simultaneously, B exists alone. In addition, the character "/" herein generally indicates that the related objects share an "or" relationship.

The method for transmitting SR according to an embodiment of the present disclosure is described in detail above with reference to FIG. 1, and a terminal device according to embodiments of the present disclosure will be described below with reference to FIGS. 2 to 3.

As shown in FIG. 2, a terminal device 200 according to an embodiment of the present disclosure includes a determining unit 210 and a transmitting unit 220. In an implementation, the terminal device 200 may further include a receiving unit 230.

Specifically, the determining unit 210 is configured to determine that there are a plurality of PUCCH resources at a target time point, where the plurality of PUCCH resources correspond to different SR configurations, and the different SR configurations correspond to different logical channels: the determining unit 210 is further configured to determine one or more target PUCCH resources among the plurality of PUCCH resources according to priorities of the different logical channels: and the transmitting unit 220 is configured to transmit one or more SRs to a network device using the one or more target PUCCH resources at the target time point.

Therefore, for the terminal device according to the embodiment of the present disclosure, when there are a plurality of PUCCH resources available at any time, where the plurality of PUCCH resources correspond to different SR configurations and the different SR configurations correspond to different logical channels, a terminal device may select an SR configuration corresponding to a logical channel with a highest priority according to priorities of the different logical channels, and transmit an SR to a network device by using a PUCCH resource corresponding to the SR configuration among the plurality of PUCCH resources, so as to avoid collisions among the plurality of PUCCH resources, thereby improving transmission efficiency.

In an implementation, the determining unit 210 is specifically configured to determine one or more logical channels with the highest priority among the different logical channels as target logical channel; determine one or more SR configurations corresponding to the one or more target logical channels as target SR configuration; and determine one or more PUCCH resources corresponding to the one or more target SR configurations among the plurality of PUCCH resources as target PUCCH resource.

In an implementation, the one or more logical channels with the highest priority among the different logical channels includes at least two logical channels, and the determining unit 210 is specifically configured to determine the one or more target logical channels randomly among the at least two logical channels.

In an implementation, the receiving unit 230 is configured to receive one or more RRC messages transmitted by the network device; the determining unit 210 is further configured to determine the priorities of the different logical channels according to the one or more RRC messages.

In an implementation, the plurality of PUCCH resources correspond to different SRs, and the transmitting unit 220 is specifically configured to: transmit, via the one or more target PUCCH resources, the one or more SRs corresponding to the one or more target PUCCH resources to the network device at the target time point.

In an implementation, the plurality of PUCCH resources correspond to different cells and/or different BWPs.

In an implementation, each of the different logical channels corresponds to at most one SR configuration.

It should be understood that the terminal device 200 according to the embodiment of the present disclosure may execute the method 100 in the embodiment of the present disclosure correspondingly, where the above and other operations and/or functions of the units in the terminal device 200 are respectively for implementing corresponding processes of the terminal device in the method shown in FIG. 1, which are not repeated herein for the sake of brevity.

Therefore, for the terminal device according to the embodiment of the present disclosure, when there are a plurality of PUCCH resources available at any time, where the plurality of PUCCH resources correspond to different SR configurations and the different SR configurations correspond to different logical channels, a terminal device may select an SR configuration corresponding to a logical channel with a highest priority according to priorities of the different logical channels, and transmit an SR to a network device by using a PUCCH resource corresponding to the SR configuration among the plurality of PUCCH resources, so as to avoid collisions among the plurality of PUCCH resources, thereby improving transmission efficiency.

Figure 3:
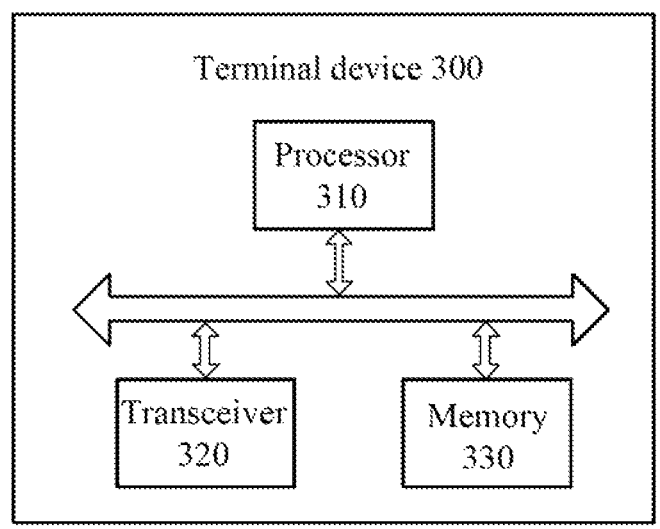
FIG. 3 is another schematic block diagram of a terminal device according to an embodiment of the present disclosure.

FIG. 3 shows a schematic block diagram of a terminal device 300 according to an embodiment of the present disclosure. As shown in FIG. 3, the terminal device 30H) includes a processor 310 and a transceiver 320, where the processor 310 and the transceiver 320 are connected. In an implementation, the terminal device 300 further includes a memory 330, and the memory 330 is connected to the processor 310. The processor 310, the memory 330, and the transceiver 320 communicate with each other through an internal connection path to transfer and/or control data signals. The memory 330 may be used to store instructions, and the processor 310 is used to execute the instructions stored in the memory 330, so as to control the transceiver 320 to transmit information or a signal. The processor 310 is configured to determine that there are a plurality of PUCCH resources at a target time point, where the plurality of PUCCH resources correspond to different scheduling request SR configurations, and the different SR configurations correspond to different logical channels, determine one or more target PUCCH resources among the plurality of PUCCH resources according to priorities of the different logical channels; the transceiver 320 is configured to transmit one or more SRs to a network device using the one or more target PUCCH resources at the target time point.

Therefore, for the terminal device according to the embodiment of the present disclosure, when there are a plurality of PUCCH resources available at any time, where the plurality of PUCCH resources correspond to different SR configurations and the different SR configurations correspond to different logical channels, a terminal device may select an SR configuration corresponding to a logical channel with a highest priority according to priorities of the different logical channels, and transmits an SR to a network by using a PUCCH resource corresponding to the SR configuration among the plurality of PUCCH resources, so as to avoid collisions among the plurality of PUCCH resources, thereby improving transmission efficiency.

As an implementation, the processor 310 is configured to determine one or more logical channels with the highest priority among the different logical channels as target logical channel; determine one or more target SR configurations corresponding to the one or more target logical channels; and determine one or more PUCCH resources corresponding to the one or more target SR configurations among the plurality of PUCCH resources as target PUCCH resource.

As an implementation, the one or more logical channels with the highest priority among the different logical channels includes at least two logical channels, and the processor 310 is specifically configured to determine the one or more target logical channels randomly among the at least two logical channels.

As an implementation, the transceiver 320 is configured to receive one or more RRC messages transmitted by the network device: the processor 310 is configured to determine the priorities of the different logical channels according to the one or more RRC messages.

As an implementation, the plurality of PUCCH resources correspond to different SRs, and the transceiver 320 is configured to: transmit, via the one or more target PUCCH resources, the one or more SRs corresponding to the one or more target PUCCH resources to the network device at the target time point.

As an implementation, the plurality of PUCCH resources correspond to different cells and/or different BWPs.

As an implementation, each of the different logical channels corresponds to at most one SR configuration.

It should be understood that the terminal device 300 according to the embodiment of the present disclosure may correspond to the terminal device 200 according to the embodiment of the present disclosure, and may correspond to a corresponding subject in executing the method 100 according to the embodiment of the present disclosure, where the above and other operations and/or functions of the units in the terminal device 300) are respectively for implementing corresponding processes of the terminal device in the method shown in FIG. 1, which are not repeated herein for the sake of brevity.

Therefore, for the terminal device according to the embodiment of the present disclosure, when there are a plurality of PUCCH resources available at any time, where the plurality of PUCCH resources correspond to different SR configurations and the different SR configurations correspond to different logical channels, a terminal device may select an SR configuration corresponding to a logical channel with a highest priority according to priorities of the different logical channels, and transmits an SR to a network device by using a PUCCH resource corresponding to the SR configuration among the plurality of PUCCH resources, so as to avoid collisions among the plurality of PUCCH resources, thereby improving transmission efficiency.

It should be noted that the foregoing method embodiment in the present disclosure may be applied to a processor, or implemented by a processor. The processor may be an integrated circuit chip with signal processing capabilities. In the implementation process, each step of the foregoing method embodiment may be completed by using an integrated logic circuit of hardware in a processor or an instruction in a form of software. The above processor may be a general purpose processor, a digital signal processor (DSP), an application specific integrated circuit (ASIC), a field programmable gate array (FPGA), or other programmable logic device, a discrete gate or a transistor logic device, a discrete hardware component. Various methods, steps, and logical block diagrams disclosed in the embodiments of the present disclosure may be implemented or executed. A general purpose processor may be a microprocessor, or the processor may be any conventional processor or the like. The steps in the method disclosed in combination with the embodiments of the present disclosure may be directly implemented by a hardware decoding processor, or may be performed by using a combination of hardware and software modules in the decoding processor. A software module may be located in a conventional storage medium known in the art, such as a random access memory, a flash memory, a read-only memory, a programmable read-only memory, or an electrically erasable programmable memory, a register, and the like. The storage medium is located in a memory, and the processor reads information in the memory and completes the steps of the foregoing method in combination with its hardware.

It can be understood that the memory in the embodiment of the present disclosure may be a volatile memory or a non-volatile memory, or may include both volatile and non-volatile memory. The non-volatile memory may be a read-only memory (ROM), a programmable ROM (PROM), an erasable PROM (EPROM), or electrically EPROM (EEPROM) or a flash memory. The volatile memory may be a random access memory (RAM), which is used as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and direct rambus RAM (DR RAM). It should be noted that the memory in the systems and methods described herein is intended to include, but is not limited to, these and any other suitable types of memory.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraint of the technical scheme. Professionals can use different methods for each specific application to implement the described functionality, but such implementation should not be considered beyond the scope of the present disclosure.

A person skilled in the art can clearly understand that for the convenience and brevity of the description, specific working processes of a system, a device and a unit described above can refer to the corresponding processes in the foregoing method embodiments, and details are not described herein again.

In the several embodiments provided by the present disclosure, it should be understood that the disclosed system, device, and method may be implemented in other manners. For example, the device embodiments described above are merely illustrative. For example, the division of the unit is only a logical function division, and in an actual implementation, there may be another division manner, for example, a plurality of units or components may be combined or can be integrated into another system, or some features can be ignored or not executed. In addition, the mutual coupling or direct coupling or communication connection shown or discussed may be an indirect coupling or a communication connection through some interfaces, devices or units, and may be electrical, mechanical or otherwise.

The units described as separate components may or may not be physically separated, and the components displayed as units may or may not be physical units, that is, may be located in one site, or may be distributed to a plurality of network units. Some or all of the units may be selected according to actual needs to achieve the purpose of the solution of the embodiments.

Furthermore, each functional unit in the embodiments of the present disclosure may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present disclosure, in nature, or a part which makes contributions to the prior art, or a part of the technical solution, may be embodied in the form of a software product, which is stored in a storage medium, where a plurality of instructions are included to cause a computer device (which may be a personal computer, a server, or a network device, etc.) to perform all or part of the steps of the method described in the embodiments of the present disclosure. The foregoing storage medium includes: a USB flash disk, a mobile hard disk, a ROM, a RAM, a magnetic disk, or an optical disk, and the like which can store program codes.

The foregoing description only relates to specific embodiments of the present disclosure; however, the scope of protection of the present disclosure is not limited thereto, and changes or substitutions that can be readily think of by any person skilled in the art within the technical scope disclosed in the present disclosure shall be covered by the scope of protection of the present disclosure. Therefore, the scope of protection of the present disclosure shall be subject to the scope of protection of the claims.

What is claimed is:

1. A method for transmitting scheduling request (SR), comprising:
    determining that there are a plurality of physical uplink control channel (PUCCH) resources at a target time point, wherein the plurality of PUCCH resources correspond to different SR configurations, and the different SR configurations correspond to different logical channels;
    determining one or more target PUCCH resources among the plurality of PUCCH resources according to priorities of the different logical channels, wherein the one or more target PUCCH resources comprise at least two PUCCH resources; and
    transmitting one or more SRs to a network device at the target time point by using the one or more target PUCCH resources;
    wherein the transmitting one or more SRs to a network device at the target time point by using the one or more target PUCCH resources comprises:
        determining, by performing listen before talk (LBT) on an unauthorized frequency band, one PUCCH resource among the at least two PUCCH resources; and
        transmitting, via the one PUCCH resource, an SR to the network device at the target time point.

2. The method according to claim 1, wherein the determining one or more target PUCCH resources among the plurality of PUCCH resources according to priorities of the different logical channels comprises:
    determining one logical channel randomly among at least two logical channels with a highest priority among the different logical channels as a target logical channel;
    determining one SR configuration corresponding to the one target logical channel as one target SR configuration; and
    determining at least two PUCCH resources corresponding to the one target SR configuration among the plurality of PUCCH resources as the target PUCCH resources.

3. The method according to claim 1, wherein the method further comprises:
    receiving one or more radio resource control (RRC) messages transmitted by the network device; and
    determining the priorities of the different logical channels according to the one or more RRC messages.

4. The method according to claim 1, wherein the plurality of PUCCH resources correspond to different SRs,
    the transmitting the one or more SRs to a network device at the target time point by using the one or more target PUCCH resources comprises:
    transmitting, via the one PUCCH resource, the SR corresponding to the one PUCCH resource to the network device at the target time point.

5. The method according to claim 1, wherein the plurality of PUCCH resources correspond to different cells or different bandwidth parts (BWPs); and
    wherein each of the different logical channels corresponds to at most one SR configuration.

6. A terminal device, comprising a memory, a processor and a transceiver, wherein:
    the memory is configured to store an instruction;
    the processor, when executing the instruction, is configured to determine that there are a plurality of physical uplink control channel (PUCCH) resources at a target time point, wherein the plurality of PUCCH resources correspond to different scheduling request (SR) configurations, and the different SR configurations correspond to different logical channels;
    the processor is further configured to determine one or more target PUCCH resources among the plurality of PUCCH resources according to priorities of the different logical channels, wherein the one or more target PUCCH resources comprise at least two PUCCH resources;
    the processor is further configured to determine, by performing listen before talk (LBT) on an unauthorized frequency band, one PUCCH resource among the at least two PUCCH resources; and
    the processor, when executing the instruction, is further configured to control the transceiver to transmit, via the one PUCCH resource, an SR to a network device at the target time point.

7. The terminal device according to claim 6, wherein in determining one or more target PUCCH resources among the plurality of PUCCH resources according to priorities of the different logical channels, the processor is configured to:
    determine one logical channel randomly among at least two logical channels with a highest priority among the different logical channels as a target logical channel;
    determine one SR configuration corresponding to the one target logical channel as one target SR configuration; and determine at least two PUCCH resources corresponding to the one or more target SR configuration among the plurality of PUCCH resources as the target PUCCH resources.

8. The terminal device according to claim 6, wherein the processor, when executing the instruction, is further configured to control the transceiver to receive one or more radio resource control (RRC) messages transmitted by the network device; and determine the priorities of the different logical channels according to the one or more RRC messages.

9. The terminal device according to claim 6, wherein the plurality of PUCCH resources correspond to different SRs, the processor, when executing the instruction, is further configured to control the transceiver to transmit, via the one PUCCH resource, the SR corresponding to the one PUCCH resource to the network device at the target time point.

10. The terminal device according to claim 6, wherein the plurality of PUCCH resources correspond to different cells and different bandwidth parts (BWPs); and wherein each of the different logical channels corresponds to at most one SR configuration.

\* \* \* \* \*